UNITED STATES PATENT OFFICE.

SPENCER B. NEWBERRY, OF SANDUSKY, OHIO.

WATERPROOF PORTLAND CEMENT AND PROCESS OF MAKING SAME.

No. 851,247.  Specification of Letters Patent.  Patented April 23, 1907.

Application filed March 13, 1905. Serial No. 249,736.

*To all whom it may concern:*

Be it known that I, SPENCER B. NEWBERRY, a citizen of the United States, residing at Sandusky, in the county of Erie and State of Ohio, have invented a certain new and useful Improvement in Waterproof Portland Cement and the Processes of Making the Same, of which the following is a full, clear, and exact description.

The primary object of this invention is to produce a water proof Portland cement,—that is to say, a Portland cement which, when made into mortar or concrete, and allowed to set, will be permanently impervious to water.

The invention is in part a process of rendering cement water proof, which consists in mixing therewith a small percentage of an insoluble lime salt of a fatty acid, preferably stearate of lime, substantially free from glycerine or other soluble substance.

It also consists in the product of that process, namely, a cement rendered water proof by the mixture therewith of a small percentage of an insoluble lime salt of one of the fatty acids, preferably stearate of lime.

The stearate of lime to be employed may be made in any suitable manner. It may be made by a dry process, to wit, by heating one part of stearic acid with two parts (more or less) of dried slaked lime. Or it may be made by a wet process, to wit, by adding the stearic acid to hot milk of lime. Specifically fifty pounds, more or less, of quick lime may be slaked in a hundred pounds, more or less, of water, and to this mixture, while it is still hot, may be added about thirty pounds of stearic acid. The resultant stearate of lime is to be dried so that it is in the form of a dry powder. The resultant of either method of operation, above described, is an insoluble stearate of lime, mixed with a greater or less excess of hydrate of lime, according to the quantity of lime employed.

The stearate of lime may be added to the cement clinker and ground therewith: I prefer, however, to add it to the finished dry cement. In fact it is preferable to keep the cement and the stearate of lime separated until a water proof cement is required for use. I have found that one or two per cent of stearate of lime added to the dry cement, is all that is required to render the mortar or concrete made therefrom absolutely and permanently impervious to water; and this is true even when cement is mixed with so large a proportion of sand as five parts of sand to one of cement.

I am aware that various materials have been proposed, and to some extent used as additions to cement and plaster to prevent the absorption of water. These various materials have been produced by saponifying, in various ways, various kinds of fats, oils and waxes. But all of said materials heretofore proposed or used for this purpose have retained the glycerine which is set free by the saponification, and have, in fact, been soft soaps. They are, therefore, in part, soluble in water, that is to say the glycerine therein is soluble. For this reason cement or plaster, with which these materials are mixed, is not impervious to water and becomes less so as the glycerine is dissolved by the water. The water proofing material hereinbefore described is, however, free from glycerine or any other material soluble in water, being a lime salt of a fatty acid, which acids are, as is known to all chemists, formed from fats by breaking up the chemical combination of the glycerine with said fatty acids, and segregating them from the glycerine. The lime salt of a fat acid is absolutely insoluble in water; and the addition of this substance to cement or plaster in the manner and substantially the proportions heretofore described renders the resultant compound, when set, substantially and permanently water proof.

I claim:

1. The process of rendering cement water proof, which consists in mixing therewith a small percentage of the insoluble lime salt of a fatty acid, substantially free from glycerine or other soluble substance.

2. The process of rendering cement water proof, which consists in mixing therewith a small percentage of insoluble stearate of lime, substantially free from glycerine or other soluble substance.

3. A composition of matter resulting from the described process, which consists of cement mixed with a small percentage of the insoluble lime salt of a fatty acid, substantially free from glycerine or other soluble substance.

4. A composition of matter which consists of cement mixed with a small percentage of insoluble stearate of lime substantially free from glycerine or other soluble substance.

In testimony whereof, I hereunto affix my signature in the presence of two witnesses.

SPENCER B. NEWBERRY.

Witnesses:
 HENRY JEAVONS,
 BERT MARTIN.